United States Patent [19]
Hodson et al.

[11] 3,876,788
[45] Apr. 8, 1975

[54] HETEROCYCLIC COMPOUNDS IN THE TREATMENT OF INFLAMMATORY OF ARTHRITIC CONDITIONS

[75] Inventors: Harold Francis Hodson, Hayes; Anthony Winchester Randall, West Wickham, both of England

[73] Assignee: Burroughs Wellcome Co., Research Triangle Park,, N.C.

[22] Filed: Nov. 15, 1972

[21] Appl. No.: 306,716

Related U.S. Application Data

[62] Division of Ser. No. 175,329, Aug. 26, 1971, Pat. No. 3,792,050.

[30] Foreign Application Priority Data
Aug. 27, 1970 United Kingdom............... 41402/70
Nov. 30, 1970 United Kingdom............... 56781/70

[52] U.S. Cl. .............................................. 424/251
[51] Int. Cl............................................ A61k 27/00
[58] Field of Search.................. 424/251; 260/251 A

[56] References Cited
UNITED STATES PATENTS
3,652,570   3/1972   Gittos et al. .................... 260/288 R

*Primary Examiner*—Stanley J. Friedman
*Attorney, Agent, or Firm*—Dike, Bronstein, Roberts, Cushman & Pfund

[57] ABSTRACT

The compounds 3,4-dihydro-2-oxo-2H-pyrimido[2,1-a]isoquinoline and 3,4,6,7-tetrahydro-2-oxo-2H-pyrimido[2,1-a]isoquinoline and acid addition salts thereof, pharmaceutical compositions containing them; and methods of preparing the compounds, salts and pharmaceutical compositions. The compounds, salts and compositions are useful in the treatment of arthritis.

13 Claims, No Drawings

HETEROCYCLIC COMPOUNDS IN THE TREATMENT OF INFLAMMATORY OF ARTHRITIC CONDITIONS

This is a division of application Ser. No. 175,329, filed on Aug. 26, 1971, now U.S. Pat. No. 3,792,050.

This invention relates to pyrimido (2,1-a)isoquinolines, their synthesis, and pharmaceutical compositions containing them.

The compounds of this invention have the chemical structure shown in formula (I)

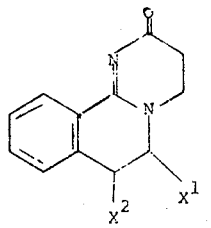

(I)

wherein $X^1$ and $X^2$ are each a hydrogen atom or together they form an additional bond.

These compounds and their acid addition salts (hereinafter referred to as the "invented compounds") have been found to have anti-inflammatory activity in mammals. In particular, the invented compounds upon oral administration, reduce the inflammation associated with the development of both primary and secondary lesions in rats with adjuvant-induced arthritis. The invented compounds are especially active in reducing the inflammation associated with secondary lesions.

Compounds having these properties are used in the treatment of inflammatory and arthritic diseases.

The anti-inflammatory activity of the invented compounds resides in the base, and the acid of the acid addition salts is of less importance though it should be chosen such that an acid addition salt is pharmacologically and pharmaceutically acceptable. For example, the acid may be a mineral acid, for example hydrochloric or sulphuric acid, or a strong organic acid, for example a carboxylic acid.

The invented compounds may be prepared by any method known for the preparation of compounds of analogous chemical structure. Thus the invented compounds may be prepared by the reaction of a compound of formula (II)

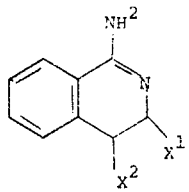

(II)

wherein $X^1$ and $X^2$ have the same meaning as before, with an alkyl acrylate ester of the formula (III)

$$CH_2 = CH.COOR$$

(III)

wherein R is an alkyl group having 1 to 6 carbon atoms, preferably a primary alkyl group. The reaction is optionally carried out in the presence of a solvent, a polar solvent being preferred. The reactants may be present in an equimolar amount, but an excess of an ester of formula (III) may be used.

The invented compounds may also be prepared, in the presence of a solvent if desired, by the reaction of a β-substituted propionate ester of formula (IV)

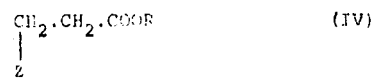

(IV)

with a compound of formula (II). In formula (IV), R is an alkyl group, and Z is a nucleophilic atom or group, preferably a halogen atom, for example chlorine, bromine or iodine or a toluenesulphonyl group. The reactants may be present in equimolar quantities but an excess of the ester may be used.

The invented compound may also be made by ring closure of the appropriate compound of formula (IV)

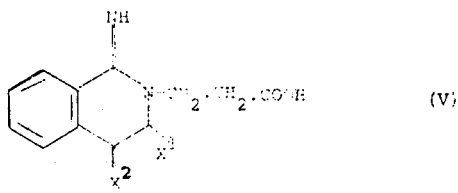

(V)

wherein $X^1$ and $X^2$ have the same meaning as before. Ring closure is most readily effected by heating a compound of formula (V) above its melting point, for example about 200°C, or by treatment with an acid, conveniently at a temperature below 100°C. Preferably a concentrated mineral acid, for example such as p-toluenesulphonic acid may be used.

The intermediates of formula (V) may be prepared by the reaction of a compound of formula (II) with acrylic acid, β-propiolactone, or β-hydroxypropionic acid. The reaction is carried out conveniently in a polar solvent such as water, or an aliphatic ketone for example acetone, preferably using equimolar quantities of the reactants and if desired using heating.

It will be understood from the preceding two paragraphs, that the intermediate compounds of formula (V), may be prepared in situ and converted to the compounds of formula (I), without the necessity of isolating the intermediate compounds of formula (V).

The invented compounds may also be prepared by oxidation of reduced forms of the compounds. Thus, 3,4-dihydro-2-oxo-2H-pyrimido (2,1-a)isoquinoline may be prepared by oxidation, at an elevated temperature with a palladium catalyst, conveniently palladium black, of a compound of formula (VI); and 3,4,6,7-Tetrahydro-2-oxo-2H-pyrimido (2,1-a)isoquinoline by oxidation at room temperature with iodine of the compound of formula (VI).

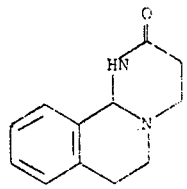

(VI)

The invented compounds may be isolated from the reaction mixture formed upon completion of a preparative process described above, either as the base or as an acid addition salt thereof. The product may then be converted, if desired, into the other form; thus the base may be converted into an acid addition salt thereof or vice versa; or an acid addition salt converted into the salt of another acid by double decomposition. These reactions may be carried out by standard chemical procedures, for example, in solution or on an ion exchange column.

For the treatment of an animal, for example a human, the invented compounds may be presented with an acceptable carrier therefor, as pharmaceutical compositions. The pharmaceutical compositions may contain from 0.1 to 99.9% w/w of invented compound. The carrier must of course be 'acceptable' in the sense of being compatible with the other ingredients of the composition. The carrier may be a solid or a liquid, and is preferably formulated with an invented compound as a composition in the form of a discrete dosage unit, for example a tablet. Other pharmacologically active substances may also be present in compositions of the present invention. The invented compounds may be incorporated in the compositions either in the form of a base or an acid addition salt thereof, but preferably as the latter, and the compositions may be formulated by any of the well-known techniques of pharmacy consisting basically of admixture of components of the composition.

For oral administration, fine powders or granules of the invented compounds may contain diluents and dispersing and surface active agents, and may be presented in a draft, in water or in a syrup; in capsules or cachets in the dry state; in an aqueous or non-aqueous suspension, when a suspending agent may also be included; in tablets, preferably made from granules of the active ingredient with a diluent, by compression with binders and lubricants; or in a suspension in water or a syrup or an oil or in a water/oil emulsion, when flavouring, preserving, suspending, thickening and emulsifying agents may also be included. The granules or the tablets may be coated, and the tablets may be scored. The invented compounds may also be administered rectally in the form of a suppository.

For parenteral administration, for example, intramuscular injection, the invented compounds may be presented in unit dose or multi-dose containers in aqueous or non-aqueous injection solutions which may contain antioxidants, buffers, bacteriostats and solutes which render the compounds isotonic with the blood; or in aqueous or non-aqueous suspensions when suspending agents and thickening agents may also be included; extemporaneous injection solutions and suspensions may be made from sterile powders, granules or tablets which may contain diluents, dispersing and surface active agents, binders and lubricants.

The invented compounds may be administered at a dose rate of from 1 to 30 mg. per kilogram body weight, a suitable dose regimen in man being from 100 mg. to 2 g. per day, preferably administered in discrete dosage unit form of pharmaceutical compositions; each unit containing conveniently from 10 to 500 mg.

The present invention may therefore be summarised as comprising:-
a. The compounds of formula (I) and acid addition salts thereof, and the intermediates of formula (V).
b. The synthesis of the invented compounds by the methods described herein.
c. Pharmaceutical compositions containing an invented compound in association with a carrier therefor; and a method of making such compositions comprising the admixture of the invented compound with the carrier.
d. A method for the treatment of inflammatory or arthritic conditions in mammals comprising the administration of an effective amount of a compound of formula (I) or a pharmaceutically acceptable acid addition salt thereof.

The following are examples of this invention, but these are not to be construed as limiting of its scope. All temperatures are in degrees Celsius.

EXAMPLE 1

A mixture of 1-aminoisoquinoline (2.9 g., 0.02 mole) and methy acrylate (1.8 g., 0.02 mole) was heated on a steam bath for 1 hour. A homogeneous melt initially formed which crystallised after about 20 minutes. Recrystallisation from ethanol gave pure 3,4-dihydro-2-oxo-2H-pyrimido (2,1-a)isoquinoline, m.p. 209°–211°.

EXAMPLE 2

Methyl acrylate (1.8 g., 0.02 mole) was added to 1-amino-3,4-dihydroisoquinoline (2.9 g., 0.02 mole). An exothermic reaction occurred and the reaction mixture rapidly crystallised. The solid mass was heated on a steam bath for a further hour to ensure complete reaction. Recrystallisation from ethanol gave pure 2-oxo-3,4,6,7-tetrahydro-2H-pyrimido[2,1-a]isoquinoline, m.p. 175°–177°.

EXAMPLE 3

A mixture of 1-aminoisoquinoline (2.9 g., 0.02 mole) and ethyl β-chloroproprionate (2.7 g., 0.02 mole) was heated on a steam bath for 3 hours. The heterogeneous mixture was dissolved in hot ethanol. On cooling, crystals of crude 3,4-dihydro-2-oxo-2H-pyrimido[2,1-a]isoquinoline hydrochloride, m.p. 279°–282°, separated. Recrystallisation from ethanol gave pure 3,4-dihydro-2-oxo-2H-pyrimido[2,1-a]isoquinoline hydrochloride, m.p. 292°–294°.

EXAMPLE 4

3-(1,2-Dihydro-1-iminoisoquinol-2-yl)propionic acid (2.2 g., 0.02 mole) was dissolved in 40 ml. of concentrated hydrochloric acid and heated on a steam bath for 2 hours. The reaction mixture was evaporated to dryness, leaving the crude hydrochloride salt of the product. Recrystallisation from aqueous ethanol gave pure 3,4-dihydro-2-oxo-2H-pyrimido[2,1-a]isoquinoline hydrochloride, m.p. 293°–295°.

EXAMPLE 5

2-oxo-1,3,4,6,7-11b-hexahydro-2H-pyrimido-[2,1-a]isoquinoline, prepared by the method of Beke and Tőke (Chem. Ber., 1962, 95, 2122–2131), was heated with palladium black for 4 hours at 180°. Fractional crystallisation from methanol gave 3,4-dihydro-2-oxo-2H-pyrimido[2,1-a]isoquinoline, m.p. 207°–209°.

EXAMPLE 6

1,3,4,6,7,11b-Hexahydro-2-oxo-2H-pyrimido[2,1-a]isoquinoline (500 mg, 0.0025 mole) was dissolved in chloroform (2 ml.) and a solution of iodine (1 g.) in chloroform (50 ml.) was added. The brown crystals which separated were removed by filtration and treated with chloroform and 2N sodium hydroxide solution. On evaporation the chloroform extract gave crude 2-oxo-3,4,6,7-tetrahydro-2H-pyrimido[2,1-a]isoquinoline, which on recrystallisation from acetone melted at 168°–172°.

EXAMPLE 7

3-(1,2-Dihydro-1-iminoisoquinol-2-yl)propionic acid was prepared by the following two methods.

a. 1-Aminoisoquinoline (2.9 g., 0.02 mole) and acrylic acid (1.4 g., 0.02 mole) were heated under reflux in water (20 ml.) for 4 hours. Evaporation to dryness under reduced pressure left a thick gum. On treatment with boiling ethanol, the gum dissolved and cream crystals of pure 3-(1,2-dihydro-1-iminoisoquinol-2-yl)propionic acid (m.p. 174°–175°) separated.

b. A solution of propiolactone (0.7 g., 0.01 mole) in 5 ml. of acetone was added to a solution of 1-aminoisoquinoline (1.4 g., 0.01 mole) in acetone (10 ml.) at room temperature. After 24 hours the oil which originally separated had solidifed. The crude 3-(1,2-dihydro-1-iminoisoquinol-2-yl)propionic acid was removed by filtration, m.p. 163°–165°. Recrystallisation from aqueous ethanol gave pure material, m.p. 174°–175°.

EXAMPLE 8

A mixture of 1-aminoisoquinoline (1.4 g., 0.01 mole) and methyl acrylate (1.8 g., 0.02 mole) was heated on a steam bath for 1 hour. An homogenous melt initially formed from which some crystalline material slowly separated. The reaction mixture was dissolved in boiling ethanol and crystals of pure 3,4-dihydro-2-oxo-2H-pyrimido[2,1-a]isoquinoline, m.p. 209°–211°, separated on cooling.

EXAMPLE 9

A solution of 1-aminoisoquinoline (1.4 g., 0.01 mole) in 20 ml. of ethanol and methyl acrylate (0.9 g., 0.01 mole) was heated under reflux for 2 hours. On cooling, crystals of pure 3,4-dihydro-2-oxo-2H-pyrimido[2,1-a]isoquinoline, m.p. 210°–212°, separated.

EXAMPLE 10

A solution of 1-aminoisoquinoline (1.4 g., 0.01 mole) in 20 ml. of toluene and methyl acrylate (0.9 g., 0.01 mole) was heated under reflux for 2 hours. The resulting solution was decanted from a small amount of black gum. On cooling, crystals of crude 3,4-dihydro-2-oxo-2H-pyrimido[2,1-a]isoquinoline, m.p. 120°–140°, separated. Recrystallisation from ethanol gave pure material, m.p. 209°–211°.

EXAMPLE 11

A mixture of 1-aminoisoquinoline (2.9 g., 0.02 mole) and n-butyl acrylate (2.6 g., 0.02 mole) was heated on a steam bath for 1 hour. An homogenous melt initially formed which crystallised after about 20 minutes. Recrystallisation from ethanol gave pure 3,4-dihydro-2-oxo-2H-pyrimido[2,1-a]-isoquinoline, m.p. 209°–211°.

EXAMPLE 12

A mixture of 1-aminoisoquinoline (1.4 g., 0.01 mole) and ethyl-$\beta$-bromopropionate (1.8 g., 0.01 mole) was heated on a steam bath for 3 hours. The heterogeneous mixture was dissolved in hot ethanol. On cooling, crystals of crude 3,4-dihydro-2-oxo-2H-pyrimido[2,1-a]isoquinoline hydrobromide, m.p. 190°–192°. Two further recrystallisations from aqueous ethanol gave pure 3,4-dihydro-2-oxo-2H-pyrimido[2,1-a]isoquinoline hydrobromide, m.p. 285°–290°.

EXAMPLE 13

3-(1,2-Dihydro-1-iminoisoquinol-2-yl)propionic acid (2.2 g., 0.01 mole) was fused on a steam bath with p-toluenesulphonic acid (1.7 g., 0.01 mole) for 2 hours. The residual gum on recrystallisation from ethanol gave pure 3,4-dihydro-2-oxo-2H-pyrimido-[2,1-a]isoquinoline p-toluenesulphonate, m.p. 180°–182°.

EXAMPLE 14

A tablet formulation for pharmaceutical use was prepared as follows:

A mixture of 3,4-dihydro-2-oxo-2H-prinido[2,1-a]isoquinoline hydrochloride (100mg of the base), Starch, B.P. (25mg) and Lactose, B.P. (200mg), was granulated with a 10% solution of hydrolysed starch (10mg starch in all) in purified water B.P. After drying the granules at 50°C, Starch B.P. (25mg) and Magnesium Stearate, B.P. (5mg) were added. The final mixture was compressed into tablets.

EXAMPLE 15

A tablet formulation for pharmaceutical use was prepared as follows:

A mixture of 2-oxo-3,4,6,7-tetrahydro-2H-pyrimido[2,1-a]isoquinoline hydrochloride (100mg of the base), Starch, B.P. (25mg) and Lactose, B.P. (200mg) was granulated with a 10% solution of hydrolysed starch (10mg starch in all) in purified water B.P. After drying the granules at 50°C, Starch B.P. (25mg) and Magnesium Stearate, B.P. (5 mg) were added. The final mixture was compressed into tablets.

We claim:

1. A method of treatment of an inflammatory or arthritic condition in a mammal comprising the administration to a mammel suffering from an inflammatory or arthritic condition of an effective or inflammatory condition treatment amount of a compound of formula

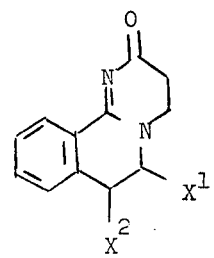

wherein $X^1$ and $X^2$ are each a hydrogen atom or together form an additional bond, or a pharmaceutically acceptable acid addition salt thereof.

2. A method as claimed in claim 1 in which from 100 mg to 2 g of the compound or salt thereof is administered per day, said weight estimated as the content of base of the salt.

3. A method as claimed in claim 1 which comprises the oral or rectal administration of 1 to 30 mg of the compound or a pharmaceutically acceptable acid addition salt thereof per kilogram body weight of mammal said weight estimated as the content of base of the salt.

4. A method as claimed in claim 2 which comprises the oral or rectal administration of 1 to 30 mg of the compound of a pharmaceutically acceptable acid addition salt thereof per kilogram bodyweight of mammal, said weight estimated as the content of base of the salt.

5. The method of claim 1 in which $X^1$ and $X^2$ are hydrogen.

6. The method of claim 1 in which $X^1$ and $X^2$ form an additional bond.

7. A pharmaceutical composition suitable for use in the treatment of arthritic or inflammatory conditions comprising an effective amount of a compound of formula

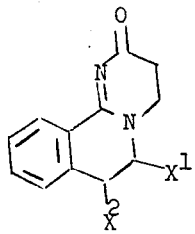

wherein $X^1$ and $X^2$ are each a hydrogen atom or together form an additional band, or a pharmaceutically acceptable acid addition salt thereof in association with a pharmaceutically acceptable carrier therefor.

8. A pharmaceutical composition as claimed in claim 7 suitable for oral or rectal administration and in the form of a discrete dosage unit containing from 10 to 500 mg of the compound or a pharmaceutically acceptable acid addition salt thereof, the said weight estimated as the content of base of a salt.

9. A pharmaceutical composition as claimed in claim 7 suitable for parenteral administration and in the form of a sterile solution or suspension, for injection.

10. A tablet suitable for oral administration in the treatment of arthritic or inflammatory conditions comprising 10 to 500 mg of 3,4-Dihydro-2-oxo-2H-pyrimido[2,1-a]isoquinoline or a pharmaceutically acceptable acid addition salt thereof, the said weight estimated as the content of base of the salt.

11. A tablet suitable for oral administration in the treatment of arthritic or inflammatory conditions comprising 10 to 500 mg of 3,4,6,7-Tetrahydro-2-oxo-2H-pyrimido[2,1-a]isoquinoline or a pharmaceutically acceptable and addition salt thereof, the said weight estimated as the content of base of the salt.

12. A composition according to claim 7 where $X^1$ and $X^2$ are each hydrogen.

13. A composition according to claim 7 where $X^1$ and $X^2$ form an additional bond.

* * * * *